United States Patent
Ni

(10) Patent No.: US 7,467,933 B2
(45) Date of Patent: Dec. 23, 2008

(54) SCROLL-TYPE FLUID DISPLACEMENT APPARATUS WITH FULLY COMPLIANT FLOATING SCROLLS

(75) Inventor: Shimao Ni, Darien, IL (US)

(73) Assignee: Scroll Laboratories, Inc., Bolingbrook, IL (US)

( * ) Notice: Subject to any disclaimer, the term of this patent is extended or adjusted under 35 U.S.C. 154(b) by 170 days.

(21) Appl. No.: 11/339,946

(22) Filed: Jan. 26, 2006

(65) Prior Publication Data

US 2007/0172373 A1    Jul. 26, 2007

(51) Int. Cl.
*F01C 1/02* (2006.01)
*F16C 19/10* (2006.01)

(52) U.S. Cl. ............... 418/55.3; 418/55.5; 418/55.1; 384/609; 384/613

(58) Field of Classification Search ............... 418/55.1, 418/55.4, 55.3, 55.5, 55.7, 104, 131, 140, 418/143; 464/102; 384/590, 604, 609, 613
See application file for complete search history.

(56) References Cited

U.S. PATENT DOCUMENTS

| | | | |
|---|---|---|---|
| 1,041,721 A | | 10/1912 | Ball |
| 2,301,105 A | * | 11/1942 | Yost ............... 384/604 |
| 2,475,247 A | | 7/1949 | Mikulasek |
| 2,494,100 A | | 1/1950 | Mikulasek |
| 2,941,853 A | * | 6/1960 | Bartholomaus ......... 384/609 |
| 3,011,694 A | * | 12/1961 | Audemar ............ 418/55.3 |
| 3,560,119 A | | 2/1971 | Busch et al. |
| 3,600,114 A | | 8/1971 | Dvorak et al. |
| 3,802,809 A | | 4/1974 | Vulliez |
| 3,817,664 A | | 6/1974 | Bennett et al. |
| 3,924,977 A | | 12/1975 | McCullough |
| 3,989,422 A | | 11/1976 | Güttinger |
| 4,160,629 A | | 7/1979 | Hidden et al. |
| 4,192,152 A | | 3/1980 | Armstrong et al. |
| 4,558,997 A | | 12/1985 | Sakata et al. |
| 4,677,949 A | | 7/1987 | Youtie |
| 4,731,000 A | | 3/1988 | Haag |
| 4,990,071 A | * | 2/1991 | Sugimoto ............ 418/55.3 |
| 5,098,265 A | | 3/1992 | Machida et al. |
| 5,171,140 A | | 12/1992 | Schäfer et al. |

(Continued)

FOREIGN PATENT DOCUMENTS

JP         05087129 A    *    4/1993

(Continued)

OTHER PUBLICATIONS

Forms PCT/ISA/220, PCT/ISA/237, PCT/ISA/210 from the corresponding PCT/US2006/062002, mailed Apr. 27, 2007.

*Primary Examiner*—Thomas Denion
*Assistant Examiner*—Mary A Davis
(74) *Attorney, Agent, or Firm*—Hamre, Schumann, Mueller & Larson, P.C.

(57) ABSTRACT

A central drive shaft-sliding knuckle combined with a peripheral crank pin-swing link mechanism (CSPS) to provide an orbiting scroll with radial and axial compliant capability. The CSPS mechanism can be applied to both dual floating scroll and single floating scroll structures to improve performances of scroll devices, particularly in oil-free operations. In addition, an orbiting dual thrust ball bearing mechanism is provided to take thrust load in, for example, a floating scroll compressor with a CSPS mechanism.

20 Claims, 14 Drawing Sheets

U.S. PATENT DOCUMENTS

| | | | |
|---|---|---|---|
| 5,193,992 A * | 3/1993 | Terauchi | 418/55.5 |
| 5,197,868 A | 3/1993 | Caillat et al. | |
| 5,247,795 A | 9/1993 | McCullough | |
| 5,304,047 A | 4/1994 | Shibamoto | |
| 5,322,426 A | 6/1994 | Kolb | |
| 5,556,269 A | 9/1996 | Suzuki et al. | |
| 5,616,015 A | 4/1997 | Liepert | |
| 5,624,247 A | 4/1997 | Nakamura et al. | |
| 5,632,611 A | 5/1997 | Sekiya et al. | |
| 5,690,480 A | 11/1997 | Suzuki et al. | |
| 5,755,564 A * | 5/1998 | Machida et al. | 418/55.3 |
| 5,775,893 A | 7/1998 | Takao et al. | |
| 5,788,470 A | 8/1998 | Okuda et al. | |
| 5,855,473 A | 1/1999 | Liepert | |
| 5,961,297 A | 10/1999 | Haga et al. | |
| 6,068,459 A | 5/2000 | Clarke et al. | |
| 6,077,057 A * | 6/2000 | Hugenroth et al. | 418/55.4 |
| 6,123,529 A | 9/2000 | Kawano et al. | |
| 6,146,119 A * | 11/2000 | Bush et al. | 418/55.4 |
| 6,149,413 A * | 11/2000 | Lifson | 418/55.5 |
| 6,186,754 B1 * | 2/2001 | Sakai et al. | 418/55.1 |
| 6,224,059 B1 * | 5/2001 | Sun | 418/55.4 |
| 6,290,477 B1 | 9/2001 | Gigon | |
| 6,331,102 B1 * | 12/2001 | Takeuchi et al. | 418/55.3 |
| 6,461,131 B2 | 10/2002 | Chang | |
| 6,758,659 B2 | 7/2004 | Ni | |
| 6,969,243 B1 * | 11/2005 | Lifson et al. | 418/55.5 |

FOREIGN PATENT DOCUMENTS

| | | |
|---|---|---|
| KR | 10-2002-0002874 | 1/2002 |

* cited by examiner

SCROLL-TYPE FLUID DISPLACEMENT APPARATUS WITH FULLY COMPLIANT FLOATING SCROLLS

FIELD OF THE INVENTION

The invention relates to a scroll-type positive fluid displacement apparatus and more particularly to a scroll-type apparatus having an improved axially and radially compliant floating scroll mechanism.

BACKGROUND OF THE INVENTION

There is known in the art a class of devices generally referred to as "scroll" pumps, compressors and expanders, wherein two interfitting spiroidal or involute spiral elements are conjugate to each other and are mounted on separate end plates forming what may be termed as fixed and orbiting scrolls. These elements are interfitted to form line contacts between spiral elements.

A pair of adjacent line contacts and the surfaces of end plates form at least one sealed off pocket. When one scroll, i.e. the orbiting scroll, makes relative orbiting motion, i.e. circular translation, with respect to the other, the line contacts on the spiral walls move along the walls and thus changes the volume of the sealed off pocket. The volume change of the pocket will expand or compress the fluid in the pocket, depending on the direction of the orbiting motion.

Referring to U.S. Pat. No. 6,758,659, a fully compliant, i.e. axially and radially, "floating" scroll mechanism with dual-scroll structure is disclosed. Referring to FIG. 1, the dual orbiting scrolls have spiral vanes on opposite sides of the end plates. In a floating scroll, the orbiting scroll is dynamically well balanced, axially and radially. The scrolls are fully, i.e. axially and radially, compliant for maintaining minimum contacting forces between components, hence achieving good sealing for high speed, high efficiency, low friction wear and power loss. A central crank shaft-sliding knuckle and/or peripheral cantilever crank pin-sliding knuckle mechanism provide the dual orbiting scroll with radial compliant capability. A synchronizer is used to synchronize the orientation of the crank handles to prevent the mechanism from jamming during operation and start up.

However, a very small relative sliding motion, or excursion, exists between the peripheral crank pin and sliding knuckles. This excursion can cause fast wear of the parts in oil-free environment. Besides, the friction wear and friction power loss resulting from axial thrust forces in a floating scroll device, particularly when the pressure differential between the discharge gas and the suction gas is large, needs to be further reduced to improve the energy efficiency and durability.

U.S. Pat. No. 4,160,629 to William P. Hidden et al. discloses non-traditional thrust ball bearings to utilize the rolling effects of balls to bear thrust forces. In non-traditional thrust ball bearings, the balls circle locally at an orbiting radius and thus, the life of the bearing is reduced. In addition, a non-traditional thrust bearing is technically complicated and costly to produce.

SUMMARY OF THE INVENTION

An improved scroll-type fluid displacement apparatus, where a central drive shaft-sliding knuckle is combined with a peripheral crank pin-swing link mechanism (CSPS) to provide an orbiting scroll with radial and axial compliant capability.

In one embodiment, the crank pin of the crankshaft has an axial hole to balance its eccentricity and for grease storage.

In another embodiment, an orbiting scroll is driven by a driving shaft via a dual radial ball bearing structure to assure that each bearing bears only radial load to extend the bearing life.

The CSPS mechanism can be applied not only to a dual floating scroll structure, but also to a single floating scroll structure.

In another embodiment, an orbiting dual thrust ball bearing mechanism in a floating scroll device to further reduce friction wear and loss caused by axial thrust force.

Other aspects of the invention will in part be obvious and will in part be apparent hereinafter.

BRIEF DESCRIPTION OF THE DRAWINGS

For a fuller understanding of the invention, reference should be made to the following detailed description taken in connection with the accompanying drawings in which:

FIG. 3A is a detailed view of the portion in circle A of FIG. 3;

FIG. 4A is a detailed view of the portion in circle A of FIG. 4;

DETAILED DESCRIPTION OF THE PREFERRED EMBODIMENT(S)

Figure 2:
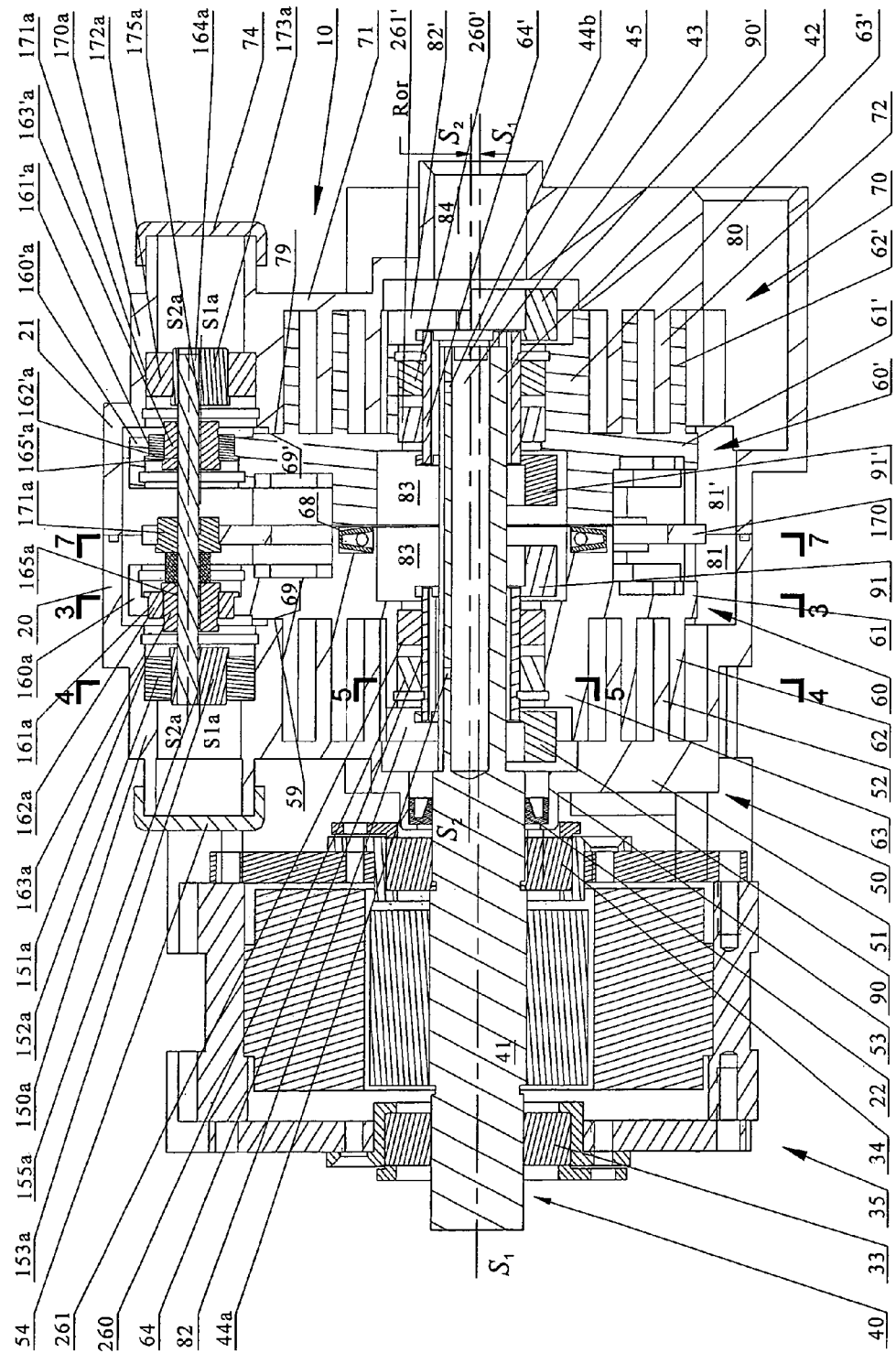
FIG. 2 is a cross-sectional view of an embodiment of a fully compliant floating scroll compressor of dual scroll structure with a CSPS mechanism in accordance with the invention.

Referring to FIG. 2, a fully compliant floating scroll air compressor of dual scroll structure with a CSPS mechanism is shown. The compressor unit 10 includes a front housing 20 and a rear housing 21. Central drive shaft 40 consists of central rod 41 and a crank pin 42. Central rod 41 is rotatably supported by bearings 33 and 34, and rotates about its axis S1-S1 when driven by motor 35. A shaft seal 22 seals off the discharge gas in the central pocket 82 from the ambient. Longitudinal hole 43 in the middle of the crank pin 42 is to balance the eccentricity of the crank pin 42 when shaft 40 rotates about axis S1-S1. Hole 43 can also store grease released gradually through hole 44a and 44b to lubricate the contact surfaces 191 of crank pin 42 and 192 and 192' of driving knuckles 64 and 64' respectively (see FIGS. 3, 4 and 5 for 191 and 192, but 192' is not shown). Plug 45 seals off grease inside hole 43. Front fixed scroll member 50 (also called the first fixed scroll) has an end plate 51 from which a scroll element 52 extends. There is a hole 53 in the center of the end plate 51 to house shaft seal 22. Central drive shaft 40 passes through hole 53 to drive the front orbiting scroll 60 (also called the first orbiting scroll) and the rear orbiting scroll 60' (also called the second orbiting scroll).

Front and rear orbiting scroll members 60 and 60' include circular end plates 61 and 61', scroll elements 62 and 62' affixed to and extending from opposite sides of the end plates 61 and 61', respectively, and orbiting bearing hubs 63 and 63' affixed to and extending in the central portion of the end plates 61 and 61', respectively. There are bearings 260 and 261 inside bearing hub 63 and bearings 260' and 261' inside bearing hub 63', respectively. The part that includes end plate 61, element 62 and hub 63 is designated as the front orbiting scroll 60, and end plate 61', element 62' and hub 63' as the rear orbiting scroll 60'. Front and rear orbiting scrolls arranged back to back, is called dual scroll. The front and rear orbiting scrolls of the dual scroll orbit together and can make movement relative to each other during operation.

Rear fixed scroll member 70 (also called the second fixed scroll) has an end plate 71, from the front side of which a scroll element 72 extends.

Scroll elements 52 and 62, 62' and 72 are interfitted at an 180 degree angular offset, and at a radial offset having an orbiting radius Ror during operation, respectively. At least one sealed off fluid pocket is thereby defined between scroll elements 52 and 62, and end plates 51 and 61. And the same is true between scroll elements 62' and 72, and end plates 61' and 71.

Working fluid enters compressor 10 from inlet ports 80 of rear housings 21 and then enter the inlet air passages 81' and 81, respectively. Inlet air passages 81 and 81' are formed between the front housing 20, the rear housing 21 and the scrolls as shown in FIG. 2. Central pockets 82 and 82' of the front and rear orbiting scrolls are connected to each other through holes 65 (FIGS. 3, 4 and 5) in hub 63 and hole 65' (not shown) in hub 63', and passages between driving knuckles 64, 64' and crank pin 42, and plenum chamber 83. The working fluid entering air passages 81 and 81', is sucked into the compression pockets formed between the scrolls and is compressed during the orbiting motion of the orbiting scrolls, and finally, discharges through passage 82, 83, 82' and discharge port 84 at the central portion of the end plate 71 of the rear fixed scroll.

FIGS. 2 through 7 show the orbiting scrolls 60 and 60' at the vertically upmost position.

Figure 3:
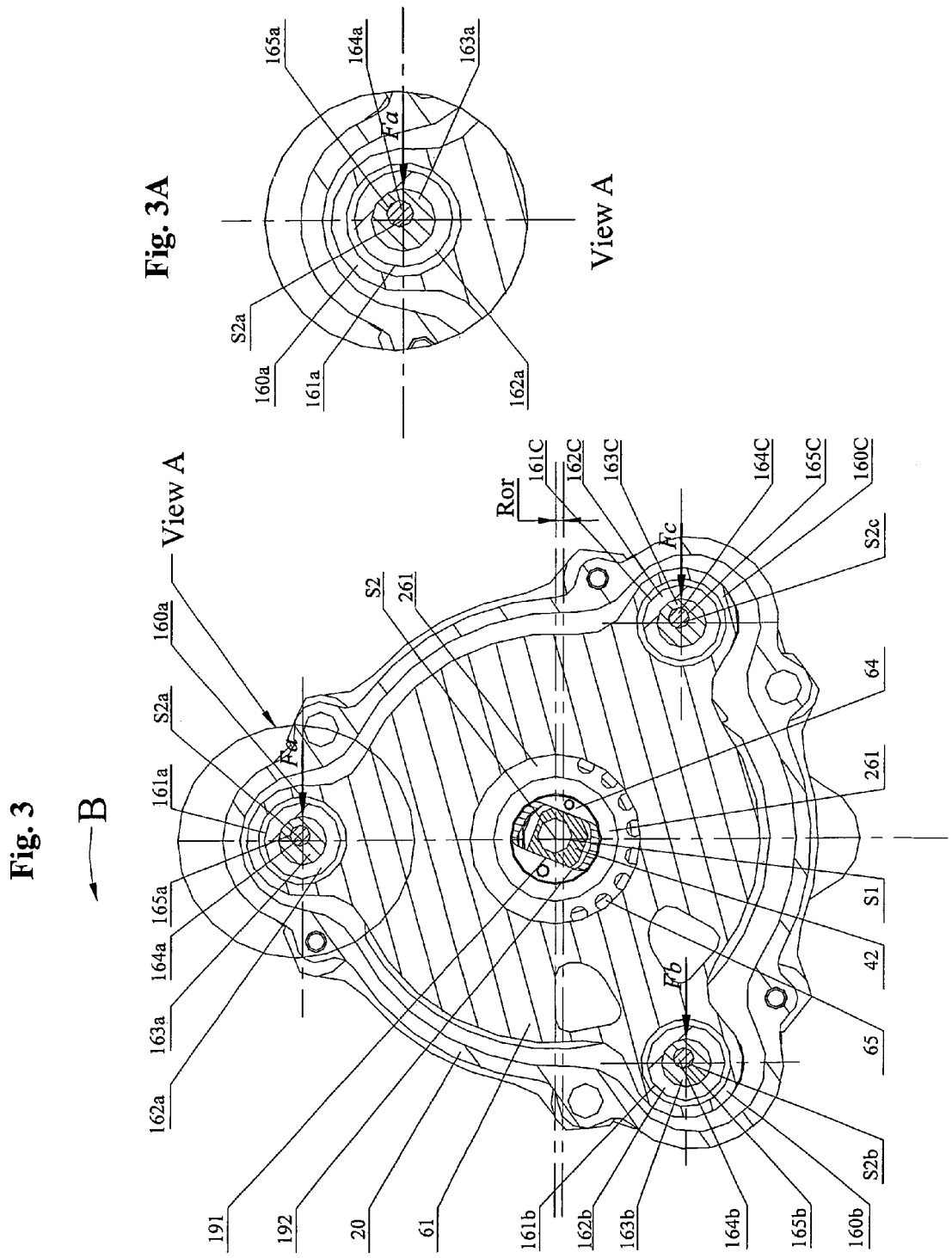
FIG. 3 is a transverse sectional view of the present invention taken along line 3-3 of FIG. 2, illustrating the CSPS mechanism in an orbiting scroll.
Figure 4:
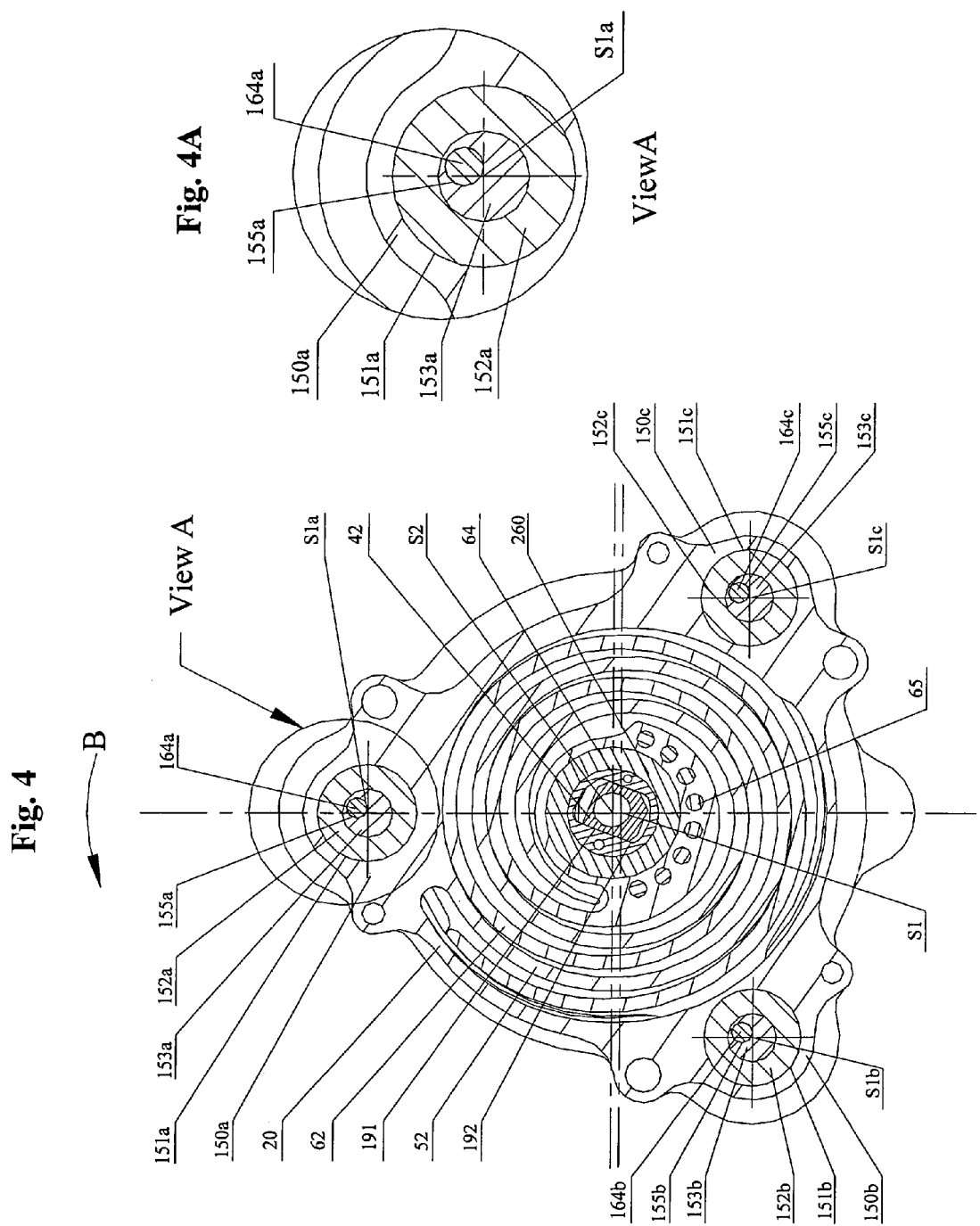
FIG. 4 is a transverse sectional view of the present invention taken along line 4-4 of FIG. 2, illustrating the CSPS mechanism in a fixed scroll.
Figure 5:
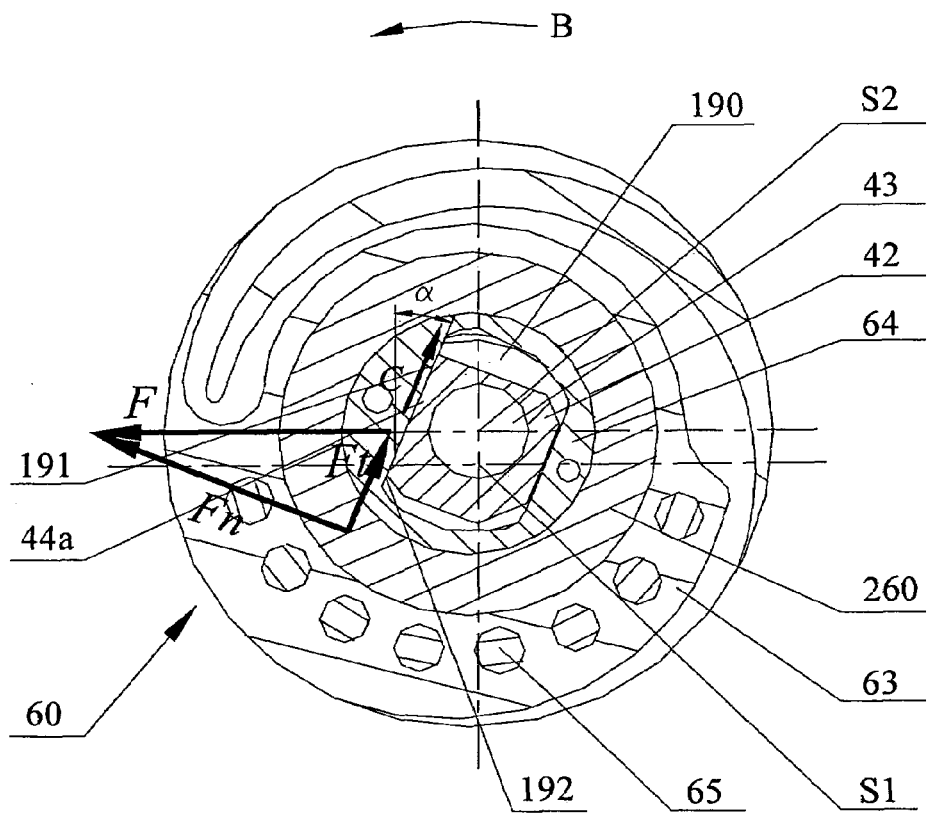
FIG. 5 is an amplified transverse sectional view of the central drive shaft-sliding knuckle mechanism taken along line 5-5 of FIG. 2.

Referring to FIGS. 2, 3, 4 and 5, crank pin 42 of the Central drive shaft 40 drives the front and rear orbiting scrolls 60 and 60' via central driving knuckles 64 and 64' and crank pin bearing 260, 261, 260' and 261', respectively. The centerline S2-S2 of central driving knuckles 64 and 64' is offset from centerline S1-S1 of the central drive shaft 40 by a distance Ror, the orbiting radius of the orbiting motion of the orbiting scrolls 60 and 60'. Each orbiting scroll uses two radial ball bearings, 260 and 261 for orbiting scroll 60 and 260' and 261' for orbiting scroll 61', respectively, for coupling the rotation of the driving knuckle with the orbiting motion of the orbiting scroll. This double ball bearing structure assures that each bearing, 260, 261, 260' and 261', bears only radial load to extend the bearing life. At the periphery of the orbiting scroll 60 and 60', there are three pairs of equally spaced peripheral portions 160a, 160b and 160c from end plate 61 and 160'a, 160'b and 160'c from end plate 61', respectively as shown in FIGS. 2 and 3 (only 160a and 160'a in FIG. 2 and 160a, 160b and 160c in FIG. 3 are shown). Referring to FIGS. 2 and 4, at the periphery of the fixed scroll 50 and 70, there are three pairs of equally spaced peripheral portions 150a, 150b and 150c from housing 20 and 170a, 170b and 170c from housing 21, respectively (only 150a and 170a in FIG. 2 and 150a, 150b and 150c in FIG. 4 are shown).

Referring to FIGS. 2 through 7, the radial compliant function of a central drive shaft-sliding knuckle with a peripheral crank pin-swing link (CSPS) mechanism is explained. For simplicity, only functions for peripheral portions 150a and 170a, one of the three pairs of peripheral portions of housing 20 and 21, and orbiting peripheral portions 160a and 160'a, one of the three pairs of peripheral portions of orbiting scroll 60 and 60' and the relevant parts, are described in detail. The functions of the rest are similar and not separately described. Referring to FIGS. 2 and 4, peripheral portions 150a and 170a of housing 20 and 21 have bearing holes 151a and 171a where front and rear fixed crank handle bearings 152a and 172a are located, respectively. Covers 54 and 74 seal off the fixed handle bearing holes 151a and 171a on fixed end plates 51 and 71, respectively. Front and rear fixed crank handles 153a and 173a are fixed in the inner races of fixed crank handle bearings 152a and 172a, respectively, and rotate together along axis S1a-S1a. The front and rear ends of peripheral crank handle pin 164a are fixed onto eccentric holes 155a and 175a of the front and rear fixed crank handles, 153a and 173a, respectively.

Figure 6:
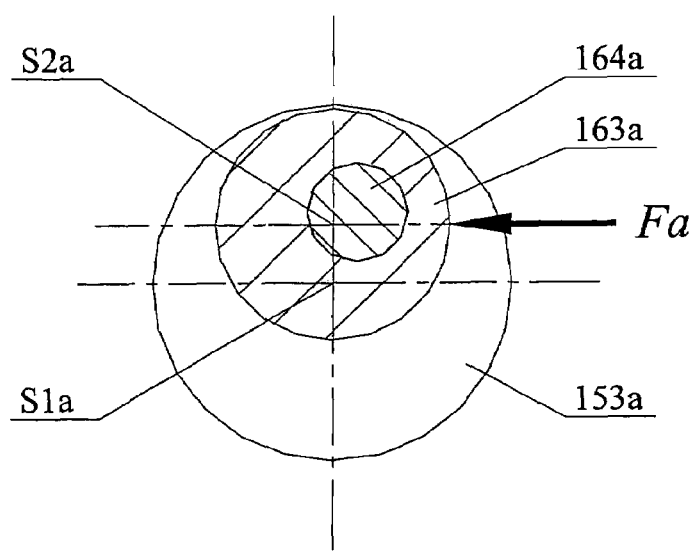
FIG. 6 is a schematic diagram illustrating the geometric relation of the peripheral swing link mechanism.

Referring to FIGS. 2 and 3 peripheral portions 160a and 160'a of the orbiting scroll 60 and 60' have bearing holes 161a and 161'a where front and rear orbiting crank knuckle bearings 162a and 162'a are located, respectively. Front and rear orbiting crank knuckles 163a and 163'a are fixed in the inner races of orbiting crank knuckle bearings 162a and 162'a, respectively, and rotate together along axis S2a-S2a. Front and rear orbiting crank knuckles 163a and 163'a have eccentric holes 165a and 165'a, respectively, where peripheral crank handle pin 164a goes slideably through. Peripheral crank handle pin 164a has a sliding fit with the eccentric holes 165a and 165'a. The geometric relations between the fixed crank handle 153a and orbiting crank knuckle 163a and their eccentricities are shown in FIG. 6. Referring FIG. 5, when the orbiting scrolls 60 and 60' are at their vertical upmost position, sliding driven-surface 192 of the driving knuckle 64 and the driving surface 191 of crank pin 42 as well incline with respect to the vertical line S1-S2, connecting centers of central drive shaft (S1) and that of orbiting scroll 60 (S2), by a wedge angle α, say 20°. There is a slot 190 in the front driving knuckle 64. Counter balancers 90 and 91 are fixed to the two ends of driving knuckles 64, respectively (see FIGS. 2 and 7). Counter balancers 90 and 91 balance the centrifugal forces caused by orbiting motion of front orbiting scrolls 60 and parts attached to it, i.e. bearings, knuckles and so on. Returning to FIG. 5, the crank pin 42 is located inside slot 190. Slot 190 is longer and wider than the crank pin 42. When crank pin 42 rotates counterclockwise as shown by arrow B, driving surface 191 of crank pin 42 pushes the sliding driven-surface 192 of front driving knuckle 64 with force $F_n$. Normal force $F_n$ is perpendicular to the sliding driven-surface 192. Tangential force $F_t$ is parallel to the sliding driven-surface 192. The resulting force F, normal force $F_n$ and tangential force $F_t$ have the following relationship:

$$F=\sqrt{F_t^2+F_n^2} \quad (1)$$

$$F_t=F_n*TAN(\alpha) \quad (2)$$

Referring to FIG. 2 through 6, the resulting force F pushes orbiting scroll 60 orbiting in direction of arrow B and the tangential force $F_t$ pushes orbiting scroll 60 sliding towards the fixed scroll 50 in the direction shown by arrow C via driving knuckle 64, driving bearing 260 and 261 and orbiting scroll bearing hub 63. As orbiting scroll 60 orbits in B direction, peripheral portions 160a, 160b and 160c of orbiting scroll 60 push corresponding orbiting crank knuckles 163a, 163b and 163c via corresponding orbiting crank knuckle bearings 162a, 162b and 162c with forces Fa, Fb and Fc, respectively. Orbiting crank knuckle 163a under force Fa swings around peripheral crank handle pin 164a clockwise. For the same reasoning, orbiting crank knuckles 163a, 163b and 163c together swing orbiting scroll 60 clockwise around peripheral crank handle pins 164a, 164b and 164c until the spiral wall of orbiting scroll 60, the bias scroll, contacts the spiral wall of fixed scroll 50, the non-bias-scroll. The above description is also true for the rear driving knuckle 64', rear orbiting scroll 60' and relevant parts. This is so called radial compliant with central drive shaft-sliding knuckle combined with a peripheral crank pin-swing link mechanism (CSPS mechanism). CSPS mechanism enables orbiting scrolls 60 and 60' making orbiting motion without rotation and radial compliant movement as well.

Figure 1:
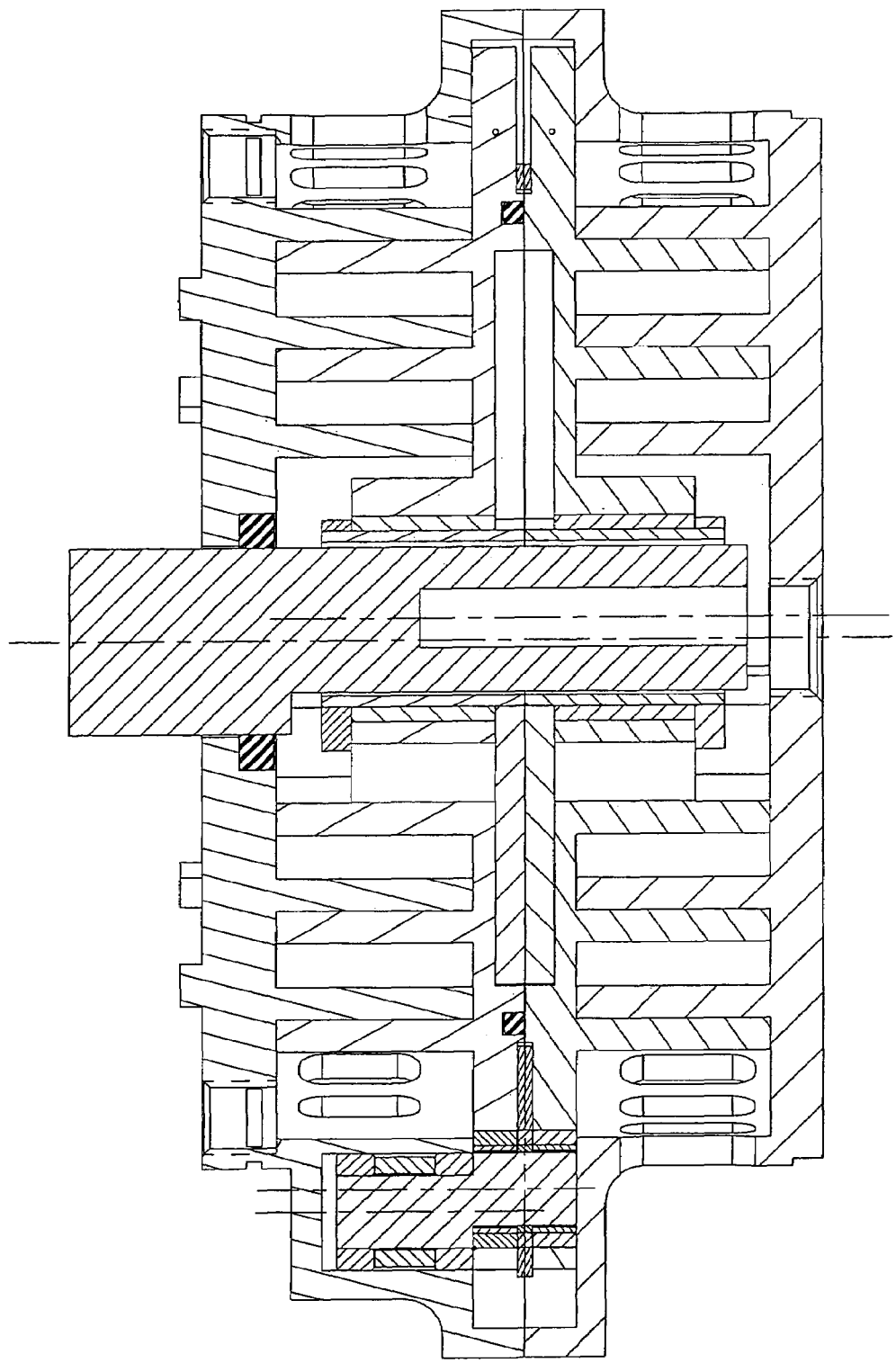
FIG. 1 is a cross-sectional view of a prior art fully compliant floating scroll compressor of dual scroll structure of referenced prior art.
Figure 7:
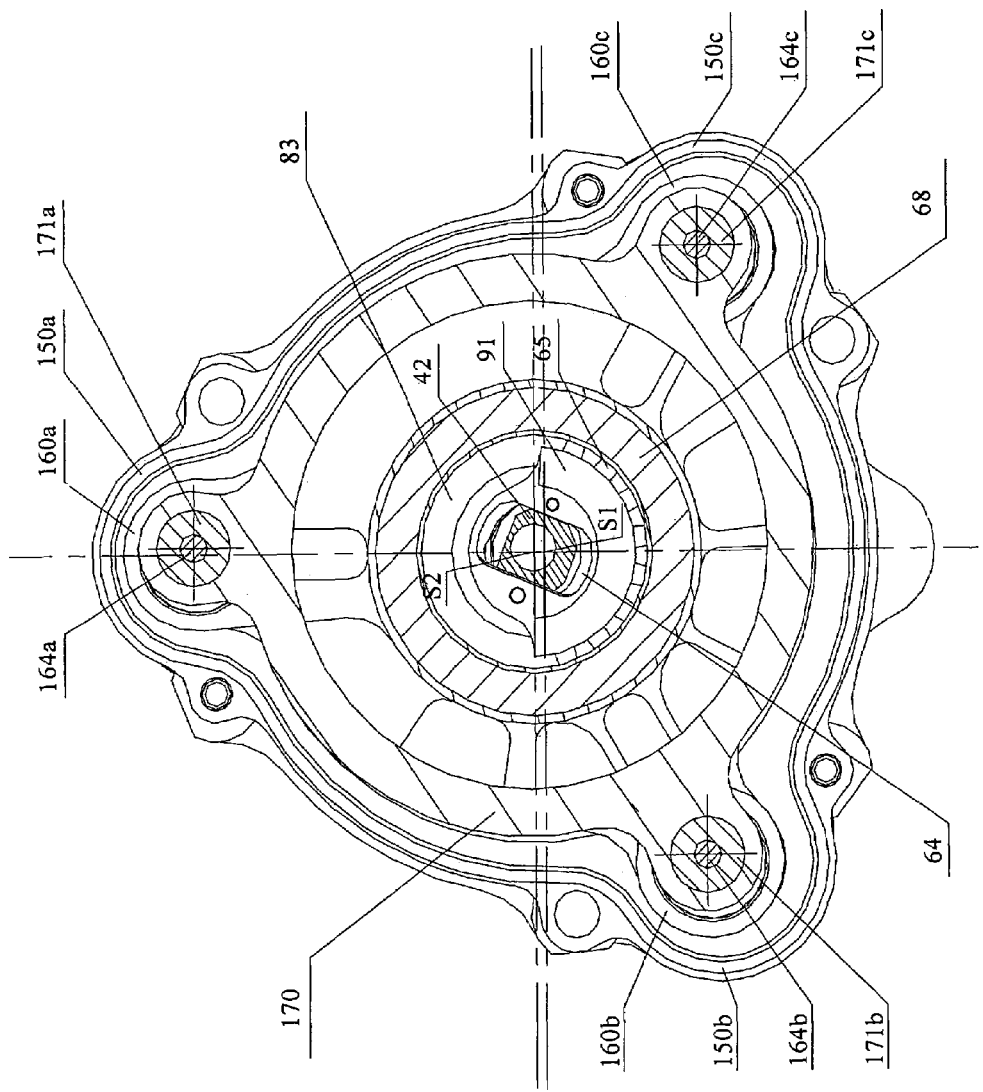
FIG. 7 is a transverse sectional view of FIG. 2 taken along line 7-7, illustrating the synchronizer, balancer and plenum chamber.

In order to maintain the synchronization of the orbiting crank knuckles, synchronizer 170, as shown in FIGS. 1 and 7, is connected to the peripheral crank handle pins 164a, 164b and 164c via synchronizer bearings 171a, 171b and 171c, respectively. The synchronizer 170 makes circular translation, i.e. orbiting motion similar to the orbiting scrolls, and keeps three peripheral crank handle pins in a triangular relation, i.e. being synchronized such that three lines, respectively connecting the fixed peripheral crank handle rotating centers with corresponding orbiting peripheral crank knuckle rotating centers, S1a-S2a (see FIG. 6), S1b-S2b and S1c-S2c remain parallel to each other all the time. During operation the lines S1a-S2a, S1b-S2b and S1c-S2c are synchronized and orbiting scrolls 60 and 60' will make swing movement with respect to the peripheral crank pins until the flanks of orbiting scroll elements 62 and 62' lightly contact the flanks of the fixed scroll elements 52 and 72, respectively, to achieve tangential sealing between the compression pockets. Overall balance of centrifugal forces of the scroll apparatus is achieved by other counterweights in a traditional way, and is not discussed here.

Referring to FIGS. 2 and 7, the axial compliant function with CSPS mechanism for the dual scroll structure will be explained. The orbiting scroll 60 and 60' have front end plates 61 and rear end plate 61', respectively. There is a plenum chamber 83 formed between the two end plates. Plenum seal 68, such as lip seal or quad ring or the similar, seals off plenum chamber 83 from air passages 81, 81' and suction ambient.

At start up, a preload by elasticity of the plenum seal 68 urges both front and rear orbiting scrolls towards their corresponding mating fixed scrolls to get light tip-base contact between the mating scrolls. The plenum chamber 83 is connected to the discharge area 82 through passages 65 (FIGS. 3 and 5) in orbiting scroll bearing hub 63 and the passages between the crank pin 42 and the slot 190 of knuckle 64. Similarly, plenum 83 is also connected to discharge area 82'. The diameter of the plenum 83 is so sized that the forces acting on the back surfaces of orbiting scrolls 60 and 60' in plenum 83 by the discharge air, respectively, slightly exceed the total axial separating forces, respectively acting on the tips and bases of the orbiting scrolls 60 and 60' by the compressed air.

The net axial forces will urge the front and rear orbiting scrolls, respectively, towards the corresponding mating fixed scrolls to achieve light contact at six pairs of contacting surfaces. Among them, two pairs of contacting surfaces are between the tip surfaces of two orbiting scrolls against the mating base surfaces of the end plates of corresponding fixed scrolls. The other two pairs of contacting surfaces, vice versa, are between the tip surfaces of two fixed scrolls against the mating base surfaces of the end plates of corresponding orbiting scrolls. The remaining two pairs of contacting surfaces are the anti-thrust surfaces 59 and 79 of the front and rear housing 20 and 21 against the thrust surfaces 69 and 69' of the front and rear orbiting scrolls, respectively. The anti-thrust surfaces 59 and 79 support surfaces 69 and 69' of the orbiting scroll, respectively, to avoid the possible tipping motion of the orbiting scrolls.

The surface contacts between the above-mentioned six pairs of contacting surfaces are not necessarily taking place simultaneously at early stage of operation. Nevertheless, after wearing-in light contacts between the six pairs of surfaces will take place simultaneously. This axial compliant mechanism enables a good radial sealing between compression pockets and makes the wear between the orbiting and fixed scrolls minimum and self-compensating. Many axial compliant schemes have been taught in the prior art, and some of them might be adapted to this invention.

Figure 8:
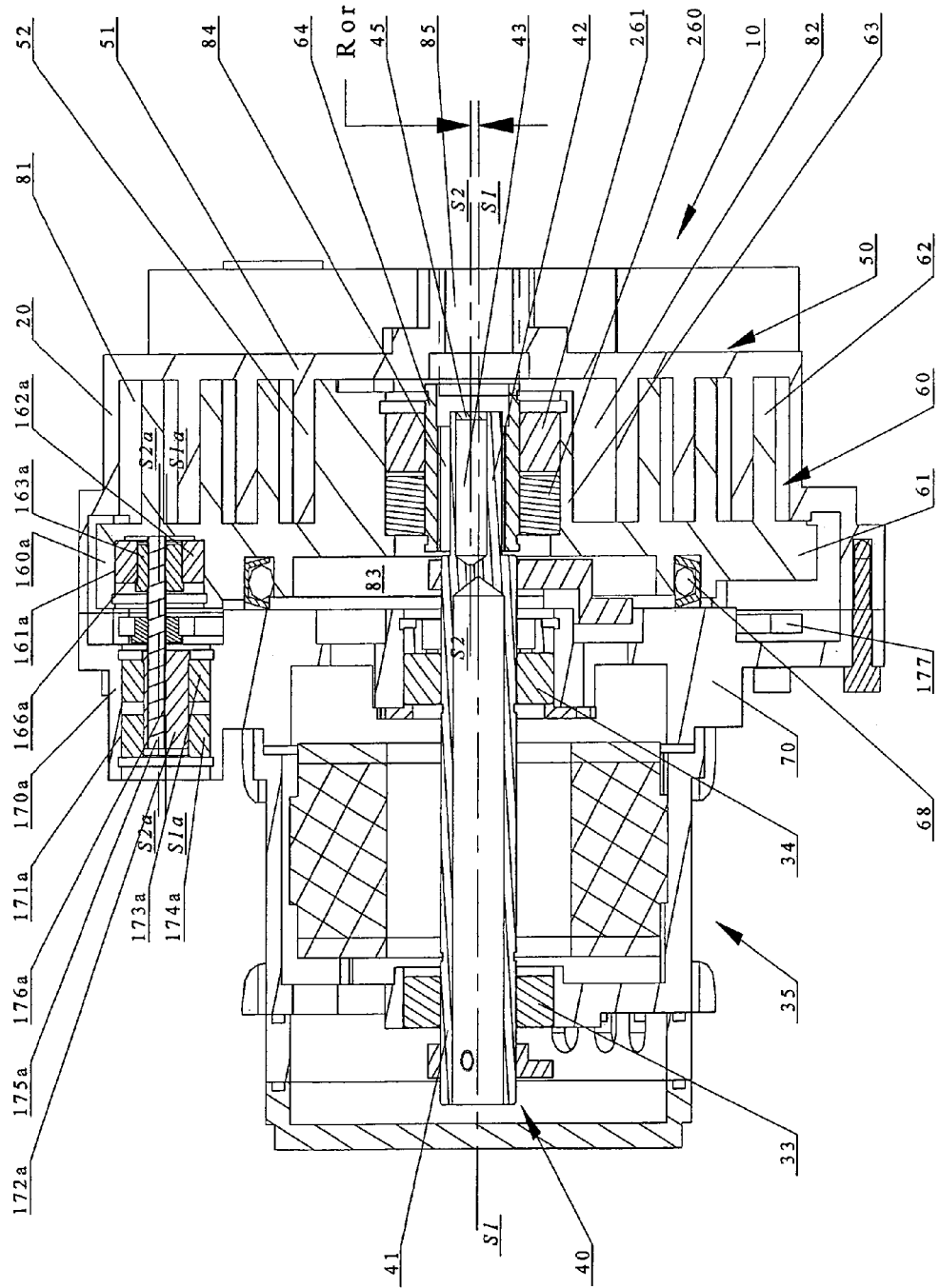
FIG. 8 is a cross-sectional view of an embodiment of a scroll compressor of single floating scroll structure with a CSPS mechanism for a fully compliant floating scroll mechanism with an orbiting lip seal mechanism.

The CSPS mechanism can also be applied in single floating scroll structure. The first embodiment of a single floating scroll compressor with CSPS mechanism is shown in FIG. 8. In a single floating scroll structure the CSPS mechanism may be seen as a half of the mechanism in a dual scroll structure. The difference is that the plenum seal 68 (see FIG. 2) is static in a dual floating scroll structure, but dynamic in a single floating scroll structure (68 in FIG. 8).

Referring to FIG. 8, the compressor unit 10 includes a main housing 20, base housing 70, hermetic sealed motor 35, central drive shaft 40, fixed scroll 50 and orbiting scroll 60. Central drive shaft 40 consists of central rod 41 and crank pin

42. Central rod 41 is rotatably supported by bearing 33 and 34, and rotates along its axis S1-S1 when driven by hermetic sealed motor 35. An axial hole 43 in the middle of crank pin 42 is to balance the centrifugal force of the crank pin 42 when shaft 40 rotates along axis S1-S1. Hole 43 can also store grease released gradually to lubricate the contact surfaces of crank pin 42 and driving knuckles 64. Plug 45 seals off grease inside hole 43.

Fixed scroll member 50 has an end plate 51 from which a scroll element 52 extends.

Orbiting scroll member 60 includes circular end plate 61, scroll element 62 affixed to and extending from end plate 61 and orbiting bearing hub 63 affixed to and extending from the central portion of the end plate 61. There are crank pin bearings 260 and 261 inside bearing hub 63 and rotate along centerline S2-S2. Scroll elements 52 and 62 are interfitted at an 180 degree angular offset, and at a radial offset, i.e. orbiting radius Ror, during operation. At least one sealed off fluid pocket is thereby defined between scroll elements 52 and 62, and end plates 51 and 61.

Working fluid, such as air, enters compressor 10 from inlet port (not shown) of housing 20 and then enters the inlet air passage 81. Inlet air passage 81 is formed between main housing 20 and the scrolls. Central pocket 82 is formed between the central portions of orbiting scroll 60 and fixed scroll 50, and is connected to plenum 83 formed between the back of orbiting end plate 61 and base housing 70 through passage 84 between central driving knuckle 64 and crank pin 42. The working fluid entering air passage 81 is sucked into the compression pockets formed between the scrolls and is compressed during the orbiting motion of the orbiting scroll, and finally, reaches central pocket 82 and discharges through discharge port 85 at the central portion of the end plate 51 of fixed scroll 50.

Crank pin 42 of central drive shaft 40 drives orbiting scrolls 60 via central driving knuckles 64 and crank pin bearings 260 and 261. Orbiting scroll 60 uses two radial ball bearings, 260 and 261 for coupling the rotation of the driving knuckle 64 with the orbiting motion of the orbiting scroll. There are three about equally spaced peripheral portions 160a, 160b and 160c at orbiting end plate 61 (160b and 160c not shown). FIG. 8 shows the orbiting scroll 60 at the vertically upmost position. At the periphery of base housing 70, there are three peripheral base portions 170a, 170b and 170c (170b and 170c not shown), spaced correspondingly to peripheral portions 160a, 160b and 160c at orbiting end plate 61, respectively. There are three bearing holes 171a, 171b and 171c (171b and 171c not shown) in the peripheral base portions 170a, 170b and 170c, respectively. For simplicity, only 160a and 170a and relevant parts are described in details below. Fixed crank handle 172a is rotatably supported by bearings 173a and 174a and rotates along their centerline S1a-S1a. Crank handle pin 175a is fixed into eccentric hole 176a of fixed crank handle 172a.

In orbiting peripheral portion 160a there is a bearing hole 161a, where orbiting crank knuckle bearing 162a is located. Orbiting crank knuckle 163a is fixed into the inner race of orbiting crank knuckle bearing 162a and rotates along axis S2a-S2a. Orbiting crank knuckle 163a has eccentric hole 166a where peripheral crank handle pin 175a slidably fits in. The geometric relations between the fixed crank handles and orbiting crank knuckle and their eccentricities can be understood by referring to FIG. 6. The principle of CSPS mechanism to provide radial compliant function in a single floating scroll structure is exactly the same as in the dual floating scroll structure that is explained above in details. The function of synchronizer 177 in a single floating scroll structure is also the same as in a dual floating scroll structure.

Below, the axial compliant function with CSPS mechanism for a single scroll structure with an orbiting lip seal mechanism is explained. Sealing element 68, such as lip seal or quad ring or the similar, seals off plenum chamber 83 from air passage 81 and suction ambient. At start up, a preload by elasticity of the sealing element 68 urges orbiting scroll 60 towards fixed scroll 50 to get light tip-base contact between the mating scrolls. During operation, chamber 83 is pressurized by air at discharge pressure. The diameter of sealing element 68 is so sized that the force by air at the discharge pressure acting on the back surfaces of orbiting scrolls 60 in plenum 83, plus the preload from the sealing element 68, slightly exceeds the total axial separating forces acting on the tips and bases of the orbiting scrolls 60 by the compressed air. The net axial force urges orbiting scroll 60 axially towards fixed scroll 50 to achieve light contact between the tip surfaces of one scroll against the mating base surface of the mating scroll. This axial compliant mechanism enables good radial sealing between compression pockets and makes wear between the orbiting and fixed scrolls minimum and self-compensating.

The second and third embodiments of single floating scroll of CSPS mechanism are basically the same as the first embodiment. The differences are the sealing mechanism for plenum 83.

Figure 9:
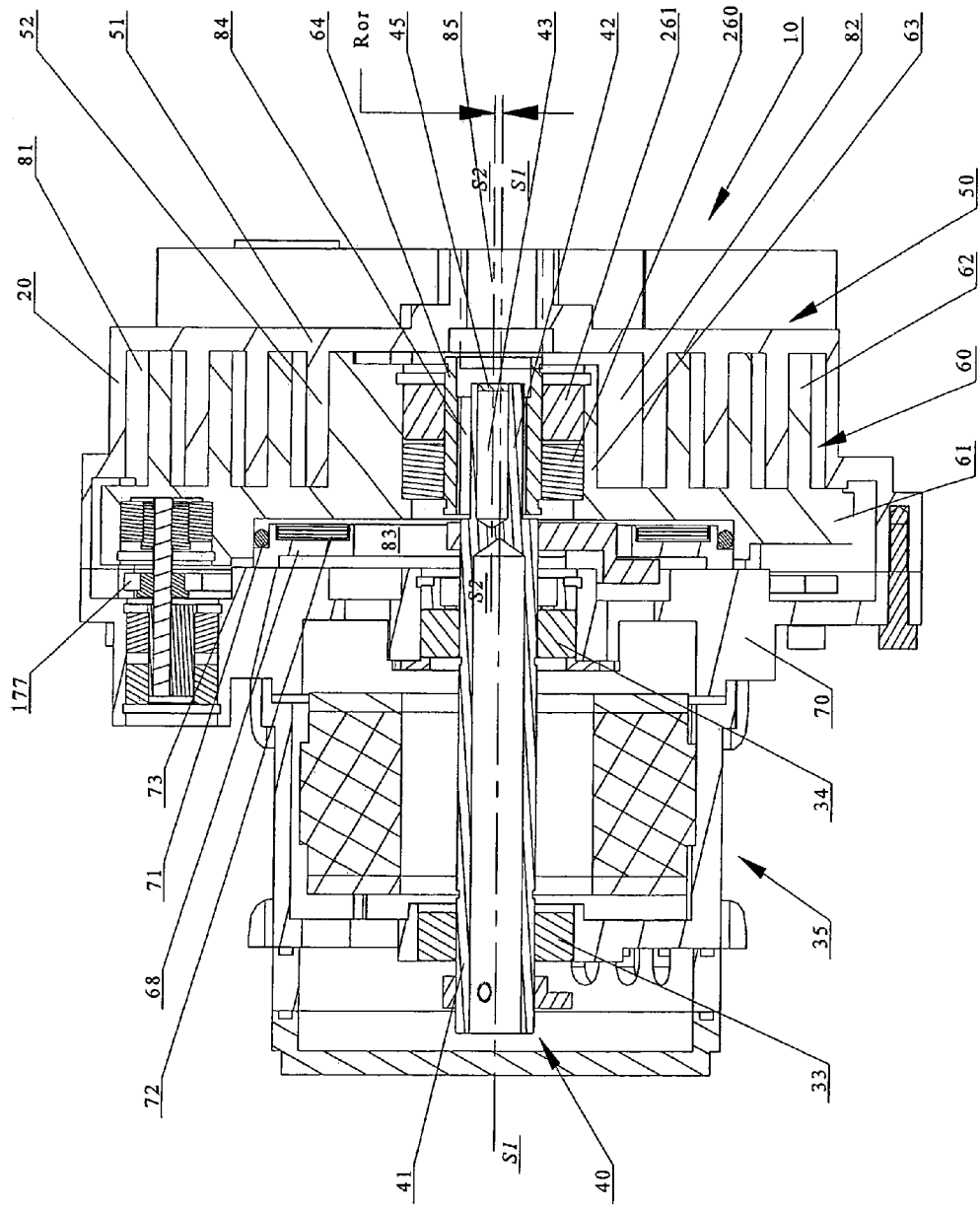
FIG. 9 is a cross-sectional view of another embodiment of a scroll compressor of single floating scroll structure with a CSPS mechanism for a fully compliant floating scroll mechanism with an orbiting moving piston seal mechanism.

Referring to FIG. 9, in the second embodiment the plenum sealing mechanism comprises of an orbiting moving piston 68, an "O" ring 71 and spring 72. The orbiting moving piston 68, energized by spring 72 and air at discharge pressure in plenum chamber 83, can move axially and orbits together with orbiting scroll 60 against surface 73 of base housing 70. This mechanism seals off plenum 83 from suction area 81. Orbiting moving piston 68 is self-compensate to improve the life of the sealing mechanism.

Figure 10:
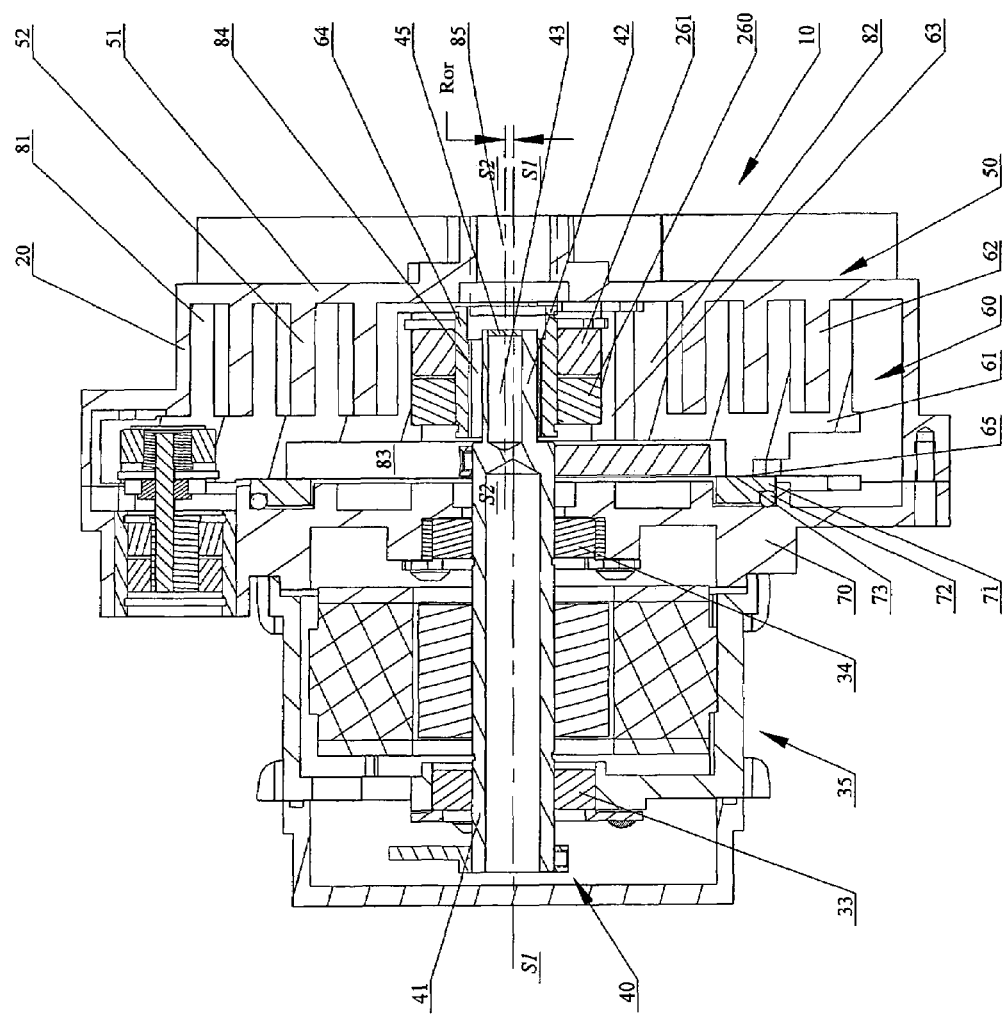
FIG. 10 is a cross-sectional view of yet another embodiment of a scroll compressor of single floating scroll structure with a CSPS mechanism for a fully compliant floating scroll mechanism with a stationary moving piston seal mechanism.

In the third embodiment of single floating scroll of CSPS mechanism with a stationary moving piston seal mechanism as shown in FIG. 10, the plenum sealing elements, i.e. moving piston 71 and "O" ring 72, are stationary instead of orbiting together with orbiting scroll 60 as in the first and second embodiments. Sealing surface 73 of piston 71 energized by "O" ring 72 keeps light contact with sealing surface 65 of orbiting endplate 61 during operation. This mechanism seals off plenum 83 from suction area 81. Piston 71 is self-compensate to improve the life of the sealing mechanism.

The friction wear and friction power loss resulted from axial forces in a floating scroll device, particularly when the pressure differential between the discharge gas and the suction gas is large, needs to be further reduced to improve the energy efficiency and durability. The fourth embodiment of the single floating scroll device, an expander as shown in FIG. 11, provides an orbiting dual thrust ball bearing structure to bear the thrust load on orbiting scroll with a semi-radial compliant CSPS mechanism.

Figure 11:
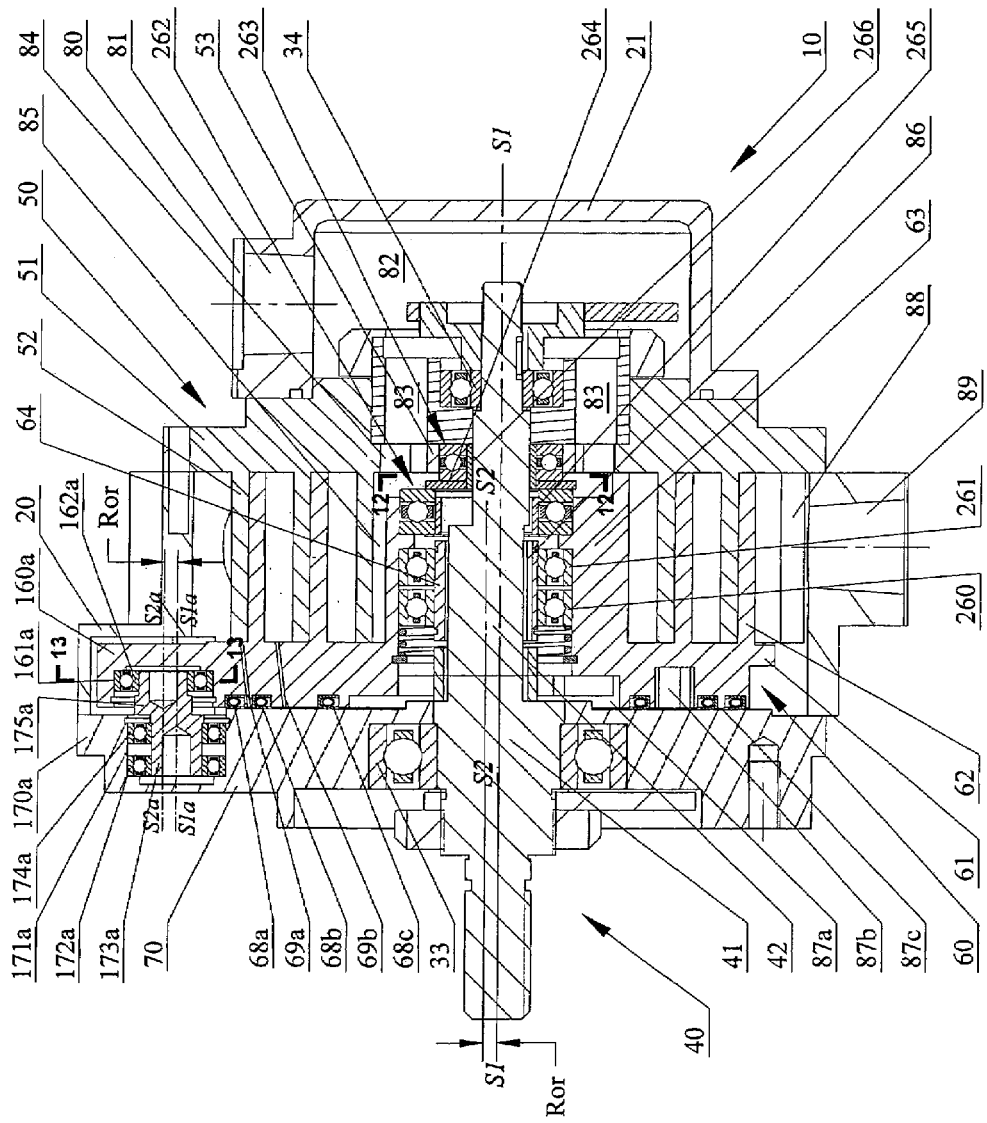
FIG. 11 is a cross-sectional view of an embodiment of a scroll expander of single floating scroll structure with an orbiting dual thrust ball bearing mechanism, a semi-radial compliant and a fully axial compliant CSPS mechanism in accordance with the invention.

Referring to FIG. 11 expander unit 10 includes a main housing 20, rear housing 21, base housing 70, central drive shaft 40, fixed scroll 50 and orbiting scroll 60. Central drive shaft 40 consists of central rod 41 and crank rod 42. Central rod 41 is rotatably supported by bearing 33 and 34, and rotates along its axis S1-S1. Fixed scroll member 50 has an end plate 51 from which a scroll element 52 extends. Orbiting scroll member 60 includes circular end plate 61, scroll element 62 affixed to and extending from end plate 61 and orbiting bearing hub 63 affixed to and extending from the central portion of end plate 61. There are crank rod bearings 260 and 261 inside bearing hub 63. Scroll elements 52 and 62 are interfitted at a 180 degree angular offset, and at a radial offset having an orbiting radius Ror during operation. At least one sealed off fluid pocket is thereby defined between scroll elements 52 and 62, and end plates 51 and 61.

Working fluid enters expander 10 from inlet port 80 of rear housing 21 and then flows via inlet passage 81, reservoir 82, and air passages 83 and 84 to central pocket 85. Central pocket 85 is formed between the central portions of the scroll elements 52 and 62. Central pocket 85 is connected to central plenum 87a between the back of orbiting end plate 61 and base hosing 70 through passage 86 between driving knuckle 64 and crank rod 42. The working fluid in central pocket 85 expands through expansion pockets formed between the scrolls during the orbiting motion of the orbiting scroll, and finally, reaches discharge zone 88 and discharges through discharge port 89 at main housing 20.

As working fluid expands, orbiting scroll 60 pushes crank rod 42 of crankshaft 40 to rotate via crank rod bearings 260 and 261 and central driving knuckles 64. The centerline S2-S2 of central driving knuckle 64 is offset from centerline S1-S1 of central drive shaft 40 by a distance Ror, the orbiting radius of the orbiting motion of orbiting scroll 60. There are three about equally spaced peripheral portions 160a, 160b and 160c at orbiting scroll end plate 61 (160b and 160c not shown).

FIG. 11 shows that the orbiting scroll 60 orbits to the vertically upmost position. At the periphery of base housing 70, there are three about equally spaced peripheral portions 170a, 170b and 170c (170b and 170c not shown) corresponding to the peripheral portions at orbiting scroll end plate 61. There are three fixed crank handle bearing holes 171a, 171b and 171c (171b and 171c not shown) in peripheral portions 170a, 170b and 170c of base housing 70, respectively. For simplicity, only 160a and 170a and relevant parts are described in details here.

In orbiting peripheral portion 160a there is an orbiting crank knuckle bearing hole 161a, where orbiting crank knuckle bearing 162a is located. Fixed crank handle 173a has fixed crank handle pin 175a extended from it. Fixed crank handle bearings 172a and 174a are located in fixed crank handle bearing hole 171a. Fixed crank handle 173 is rotatably supported by fixed crank handle bearings 172a and 174a. The centerline S2a-S2a of fixed crank handle pin 175a offsets from the centerline S1a-S1a of fixed crank handle 173a by the orbiting radius, Ror.

Figure 13:
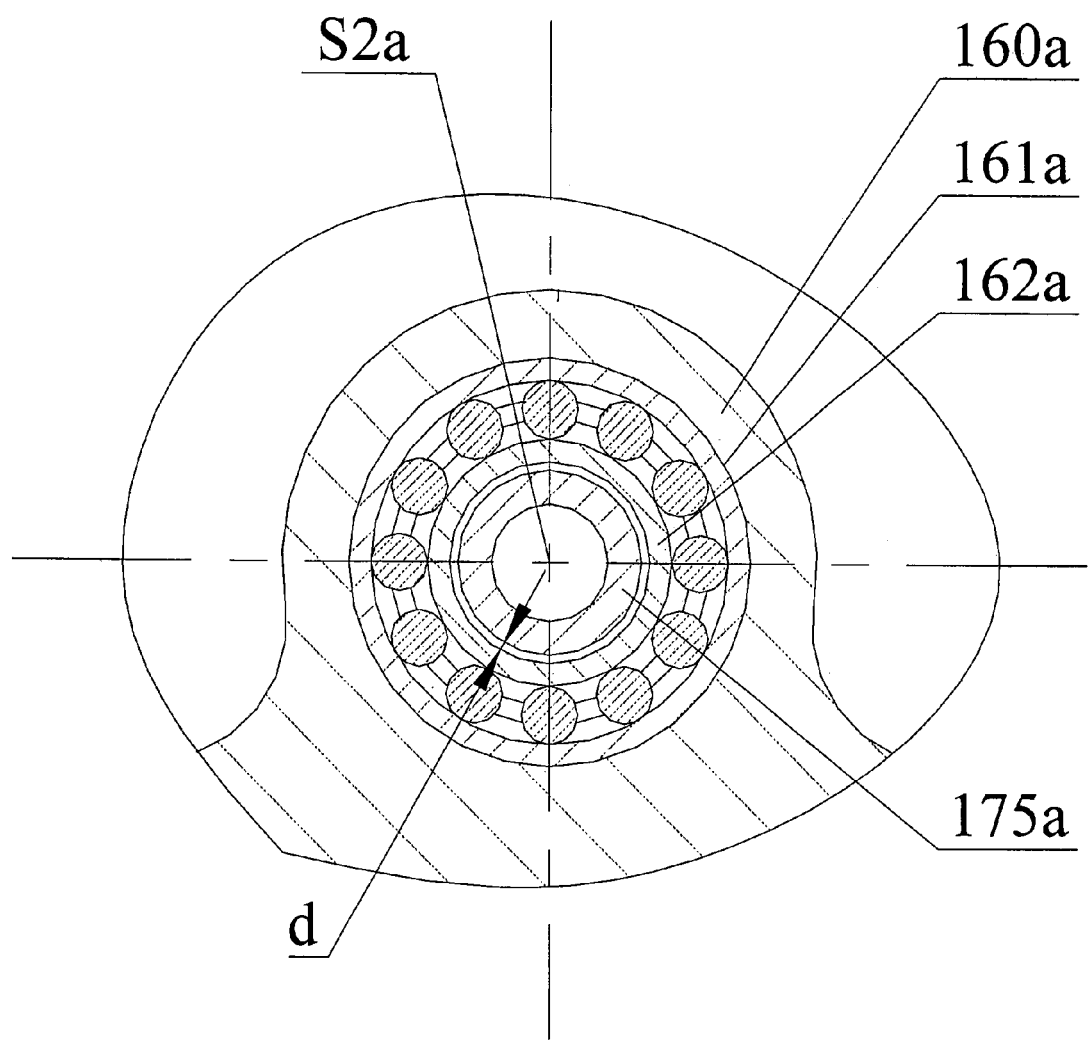
FIG. 13 is an amplified view of the traverse section illustrating the semi-radial compliant mechanism taken in FIG. 11 along line 13-13.

Referring to FIG. 13, an amplified view of cross section taken along line 13-13 of FIG. 11, fixed crank handle pin 175a loosely fits in the inner race of orbiting crank knuckle bearing 162a with a radial gap d. The value of the gap d is about 0.01-0.10 mm. Gap d plus the radial play of orbiting crank knuckle bearing 162a allow the orbiting scroll 60 moving radially towards fixed scroll 50 under centrifugal force of the orbiting scroll and/or the radial force caused by the wedge angle of crank rod 42 during operation as explained above for a CSPS mechanism until the spiral walls of the scrolls contact each other. As the spiral walls wear out gradually during operation, the radial semi-compliant mechanism of the current invention allows orbiting scroll 60 radially moving out to maintain the spiral wall contacts of the scrolls. The maximum radial movement of orbiting scrolls 60, or in other words, the maximum orbiting radius increase is limited by the gap d and the radial play of orbiting crank knuckle bearing 162a. Therefore, this radial compliant mechanism with limitation is called semi-radial compliant.

Returning to FIG. 11, there are three lip seals at the back of orbiting endplate 61, 68a, 68b and 68c forming three plenum chambers 87a, 87b and 87c, respectively, between the back of orbiting end plate 61 and base housing 70. Plenum chamber 87a communicates with the central pocket 85 at inlet pressure via passage 86. Plenum chamber 87b and 87c communicate to expansion pockets at different intermediate pressures between inlet pressure and discharge pressure via bleeding holes 69a and 69b, respectively. At start up, a preload by elasticity of the sealing elements 68a, 68b and 68c urge orbiting scroll 60 towards fixed scroll 50 to get light tip-base contact between the mating scrolls. The diameters of seals 68a, 68b and 68c, and hence the areas of the plenum 87a, 87b and 87c, are so sized that the total force, Ft, by air in plenums at different pressures acting on the back surfaces of orbiting scrolls, always exceeds the total axial separating force, Fs, acting on the tips and bases of the orbiting scrolls 60 by the air during expansion to achieve axial contact between tips and bases of corresponding scrolls. The differential between the total force, Ft, and the total axial separating force, Fs, is the net axial thrust load, Fnet.

Figure 12A:
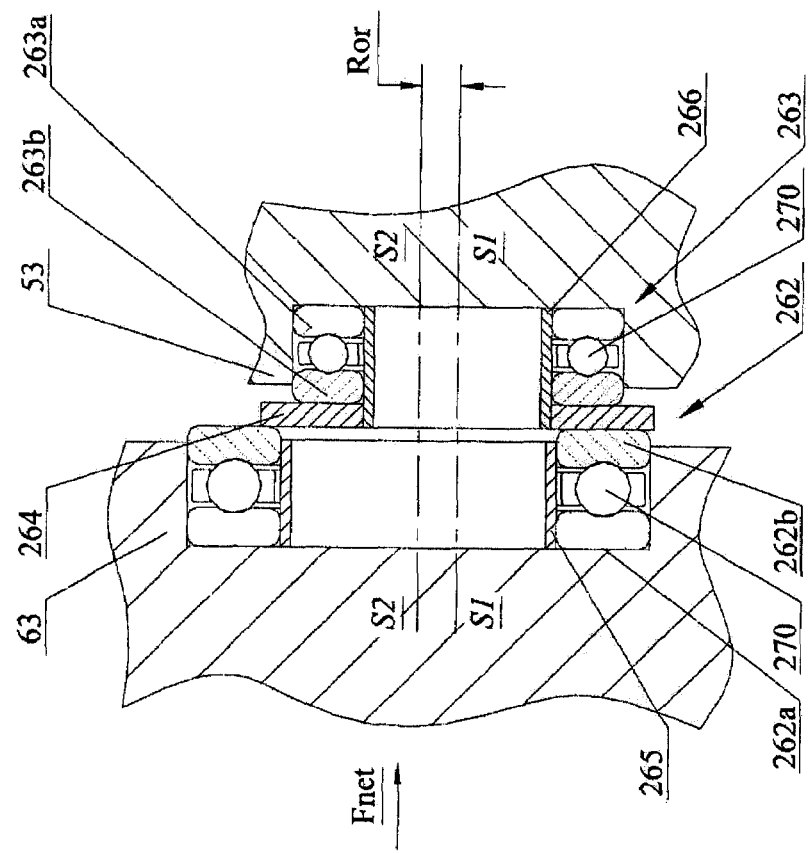
FIG. 12A is a transverse sectional view of an orbiting dual thrust ball bearing structure taken along line A-A of FIG. 12.
Figure 12:
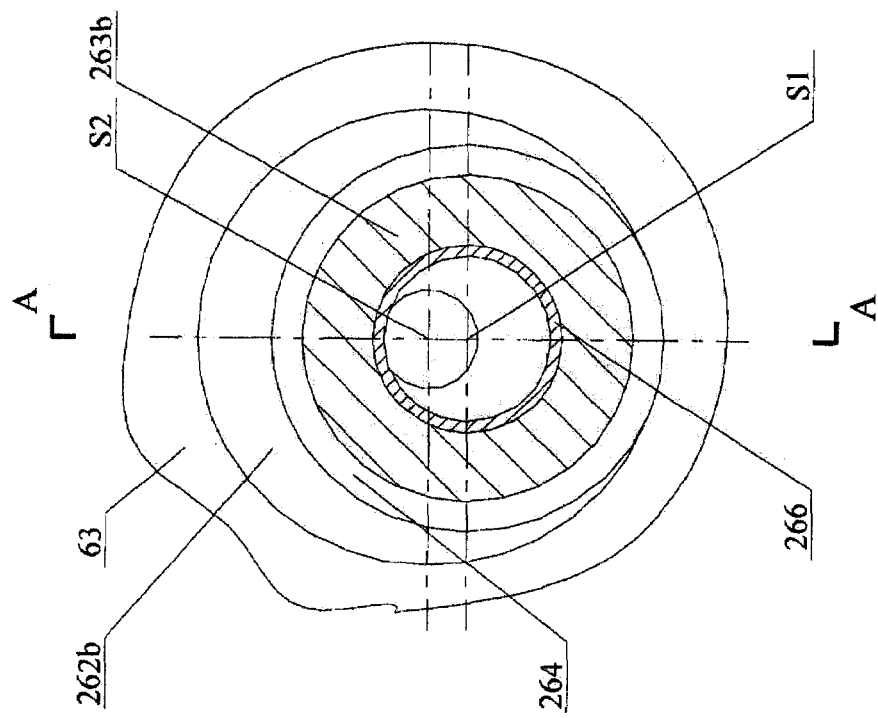
FIG. 12 is an amplified cross-sectional view of an orbiting dual thrust ball bearing structure taken along line 12-12 of FIG. 11.

Referring to FIGS. 11, 12 and 12A, the working principle of an orbiting dual thrust ball bearing mechanism is explained. An orbiting dual thrust ball bearing mechanism consists of orbiting thrust ball bearing 262 and fixed thrust ball bearing 263, which are ordinary thrust ball bearings with balls 270 and well known. In this mechanism, fixed stationary washer 263a of fixed thrust ball bearing 263 is fixed to bearing hub 53 of endplate 51 of fixed scroll 50. Fixed rotating washer 263b loosely fits into bearing hub 53 and can rotate freely around axis S1-S1. Orbiting stationary washer 262a of orbiting thrust ball bearing 262 is fixed with orbiting bearing hub 63 of orbiting scroll 60. Orbiting rotating washer 262b loosely fits into orbiting bearing hub 63 and can rotate freely along axis S2-S2.

During operation, while orbiting scroll 60 together with orbiting stationary washer 262a and orbiting rotating washer 262b orbits around axis S1-S1, orbiting rotating washers 262b and fixed rotating washer 263b rotate along their own centerlines S2-S2 and S1-S1, respectively, just like regular thrust ball bearings. The net axial thrust load, Fnet, passes along through orbiting stationary washer 262a, orbiting rotating washer 262b and fixed rotating washer 263b to fixed stationary washer 263a. However, there is relative sliding motion between orbiting rotating washer 262b and fixed rotating washer 263b to accommodate the radial excursion of orbiting scroll 60 during operation.

If necessary, there can be a self-lubricated sliding washer 264 sits between rotating pieces 262b and 263b to serve two purposes: to reduce the radial sliding friction between 262b and 263b, and as a shim to adjust the axial dimension of the orbiting dual thrust ball bearing mechanism as whole. Grease retainers 265 for orbiting thrust ball bearing 262 is fixed with the orbiting stationary washer 262a and loosely fits with orbiting rotating washer 262b and is capable keeping grease in bearing 262 during operation. Grease retainer 266 for fixed thrust ball bearing 263 operates in the same way as grease retainer 265. The grease retainers can have various forms as long as they can serve the purpose to retain the grease in the thrust bearings during operation.

Initially, thrust ball bearings 262 and 263 might or might not bear the net axial thrust load, Fnet during operation. However, the shim 264 between two thrust ball bearings is so sized that after a short time along with the wear of the tips and bases of the scrolls, thrust ball bearings 262 and 263 will bear the axial load from orbiting scroll 60 to achieve low friction and low wear.

Figure 14:
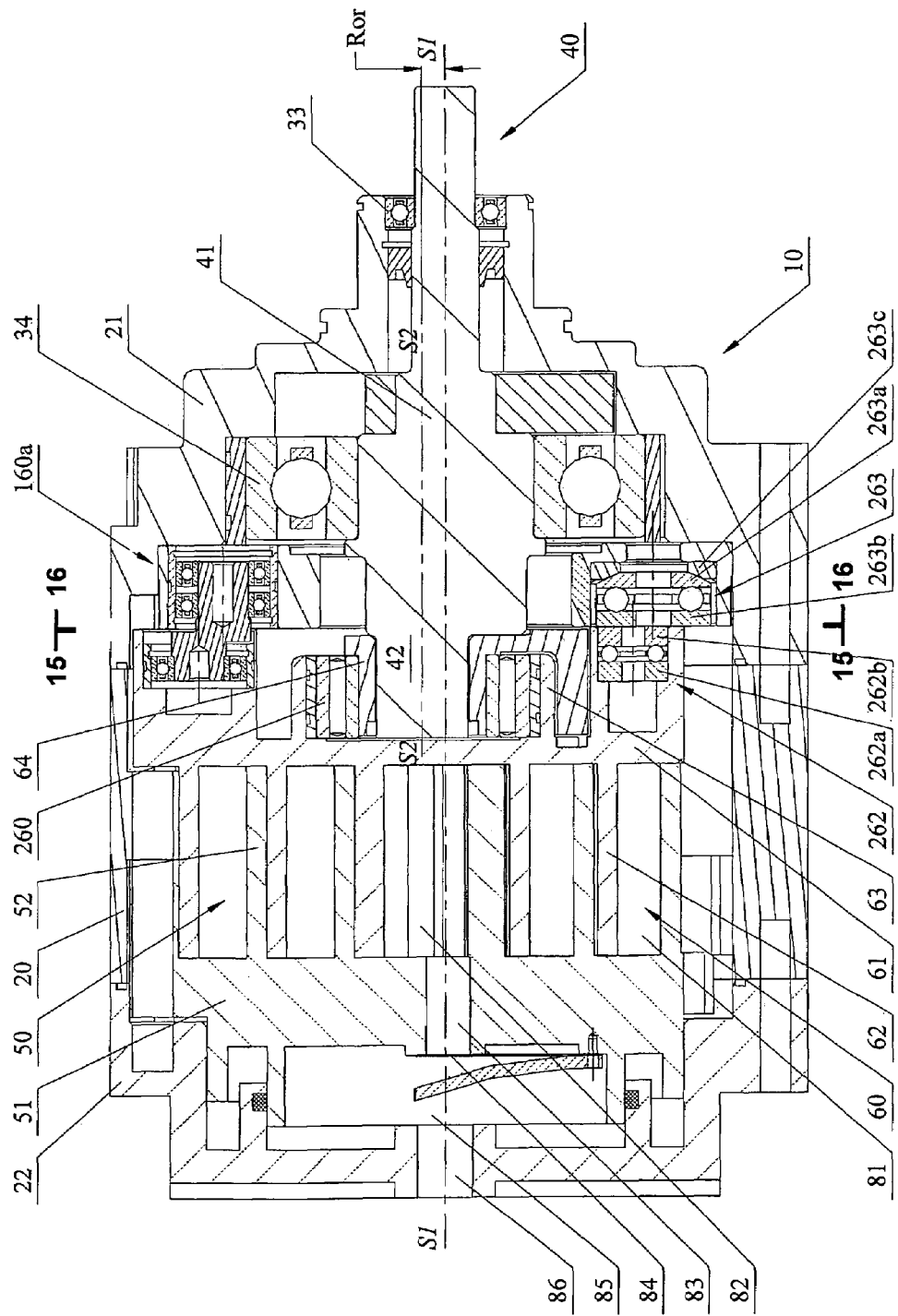
FIG. 14 is a cross-sectional view of an embodiment of a scroll air compressor of single floating scroll structure with multiple orbiting dual thrust ball bearing mechanism, a semi-radial compliant and fully-or semi-axial compliant CSPS mechanism in accordance with the invention.

The fifth embodiment of the single floating scroll device, an air compressor as shown in FIG. 14, provides a multiple orbiting dual thrust ball bearing mechanism to bear the thrust load on orbiting scroll with a semi-radial compliant and fully- or semi-axial compliant CSPS mechanism.

Referring to FIG. 14, air compressor unit 10 includes a main housing 20, base housing 21, rear housing 22, crankshaft 40, fixed scroll 50 and orbiting scroll 60. Central drive shaft 40 consists of central rod 41 and crank pin 42. Central rod 41 is rotatably supported by bearing 33 and 34, and rotates along its axis S1-S1. Fixed scroll member 50 has an end plate 51 from which a scroll element 52 extends. Orbiting scroll member 60 includes circular end plate 61, scroll element 62 affixed to and extending from end plate 61 and orbiting bearing hub 63 affixed to and extending from the central portion of end plate 61. There is crank pin bearing 260 inside bearing hub 63. Scroll elements 52 and 62 are interfitted at an 180 degree angular offset, and at a radial offset having an orbiting radius Ror during operation. At least one sealed off fluid pocket is thereby defined between scroll elements 52 and 62, and end plates 51 and 61.

Working fluid enters suction area 81 of compressor 10 from inlet port (not shown) of main housing 20 and then is compressed through compression pockets formed between the scrolls during the orbiting motion of the orbiting scroll, and finally, reaches central pocket 82, discharges through discharge hole 83 reed valve 84, discharge plenum 85 and discharge port 86 at rear housing 22. Sliding drive knuckle 64, crank pin bearing 260, crank pin 42 and peripheral swing link mechanism 160a work together as so called CSPS mechanism to play function of a redial semi-compliant mechanism that we explained above in forth embodiment referred to FIG. 11.

Figure 15:
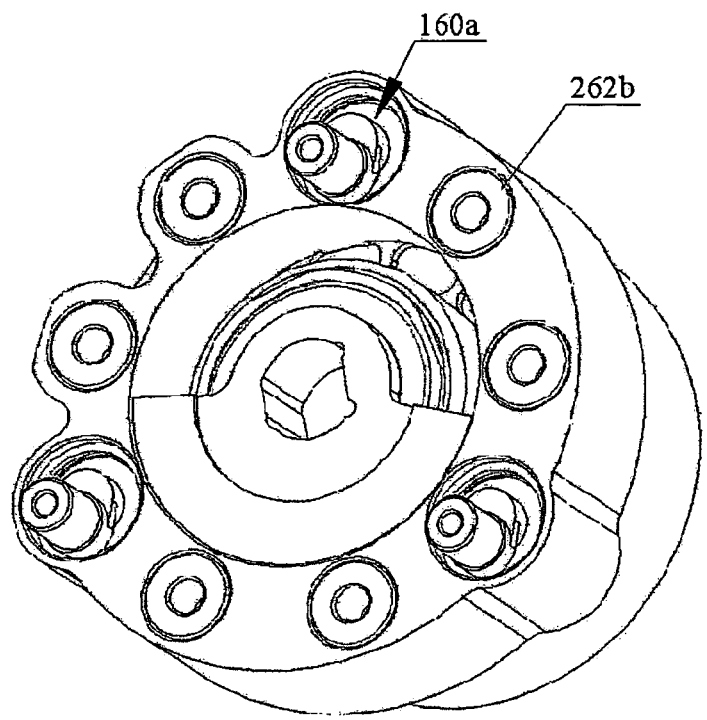
FIG. 15 is a perspective view illustrating the multiple orbiting thrust ball bearing mechanism taken along line 15-15 of the embodiment of FIG. 14.
Figure 16:
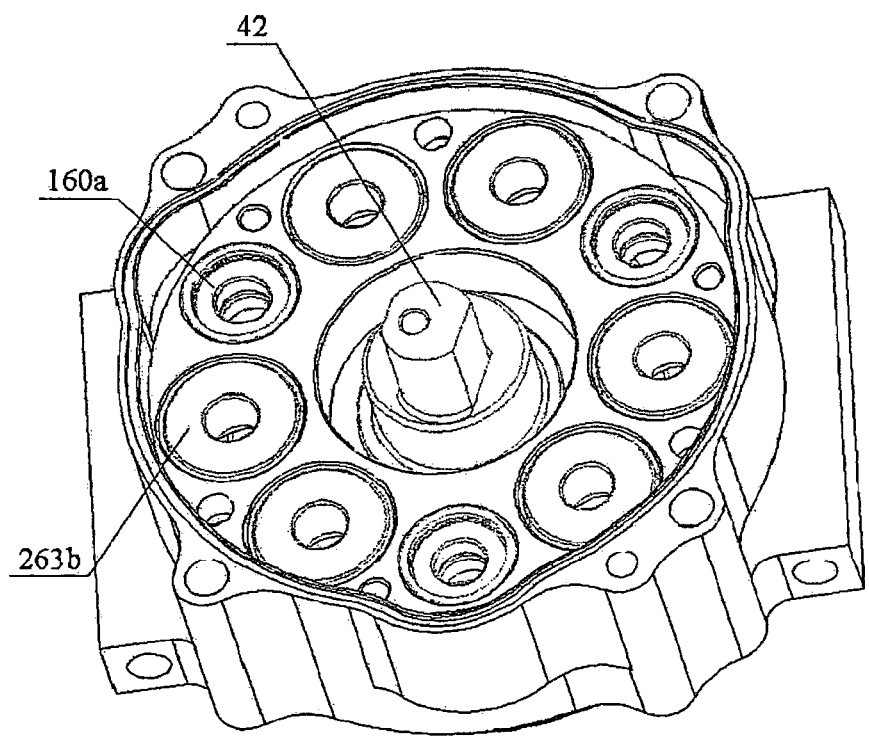
FIG. 16 is a perspective view illustrating the multiple orbiting thrust ball bearing mechanism taken along line 16-16 of the embodiment of FIG. 14.

Attention is paid to the multiple orbiting dual thrust ball bearing mechanism. Referring to FIGS. 14, 15 and 16, the multiple orbiting dual thrust ball bearing consists 6 sets of orbiting dual thrust ball bearings. Bach set of the mechanism consists of a fixed thrust ball bearing including a stationary washer, e.g. 263a, a rotating washer, e.g. 263b and a spherical surfaced base 263c, and an orbiting thrust ball bearing including a stationary washer, e.g. 262a, and a rotating washer. c.g. 263b. Each set of the orbiting dual thrust ball bearing mechanism works in the same way as we described in detail in the fourth embodiment- except the installation difference. In the fourth embodiment above, the orbiting thrust ball bearing is installed at the central region of the tip of orbiting scroll bearing hub 63 and the fixed thrust ball bearing is installed at the central region of the fixed end plate 51 (see FIG. 11). However, in the fifth embodiment, the orbiting thrust ball bearings are installed at the back of orbiting end plate 61 and the fixed thrust ball bearings are installed at the corresponding regions of base housing 21 (see FIG. 14). The purpose to use multiple sets of orbiting dual thrust ball bearing is to counter act the possible tipping movement of the orbiting scroll during orbiting motion. Each of the thrust bearing may have a grease retainer to retain grease during operation. Thus, the multiple sets of orbiting dual thrust ball bearing can take large axial thrust load on the orbiting scroll with low friction loss in oil-free environment.

In the fifth embodiment, the fixed scroll is the bias scroll to accomplish fully- or semi-axial compliant movement. The schemes of fully- or semi-axial compliant with fixed scroll as the bias scroll are well known in the prior art.

While the above-described embodiments of the invention are preferred, those skilled in this art will recognize modifications of structure, arrangement, composition and the like which do not part from the true scope of the invention. The appended claims, and all devices define the invention and/or methods that come within the meaning of the claims, either literally or by equivalents, are intended to be embraced therein.

What is claimed is:

1. A positive fluid displacement apparatus, comprising:
   a) at least one orbiting scroll member with a first end plate having a first spiral wrap affixed to a base surface of said first end plate and three generally equally-spaced peripheral portions at said first end plate;
   b) at least one stationary scroll member with a second end plate having a second spiral wrap affixed to a base surface of said second end plate of said stationary scroll member, said second spiral wrap engaged with said first spiral wrap of said orbiting scroll member, wherein when said orbiting scroll member orbits with respect to said stationary scroll member the flanks of said engaging wraps along with said base surface of said first end plate of said orbiting scroll member and said base surface of said second end plate of said stationary scroll member define moving pockets of variable volume and zones of high and low fluid pressures;
   c) a rotatable shaft arranged to drive said orbiting scroll member to experience orbiting motion with respect to said stationary scroll member;
   d) a housing, said housing supporting said stationary scroll member, and supporting said shaft within a central portion of said housing; said housing having three peripheral portions spaced corresponding to said peripheral portions at said orbiting scroll end plate;
   e) three crank handles each having a crank handle axis, each rotatably supported by a corresponding one of said peripheral portions of said housing; and
   f) a radial compliant link mechanism including a sliding knuckle connecting said shaft to said orbiting scroll member and swing link mechanisms connecting said crank handles to said peripheral portions of said orbiting scroll member, each swing link mechanism including an orbiting crank knuckle bearing having a crank knuckle bearing axis and a round crank handle pin connected to the respective crank handle and having a crank handle pin axis, the crank handle pin axis is offset from the crank knuckle bearing axis and offset from the crank handle axis, and the crank knuckle bearing axis is offset from the crank handle axis, where the radial compliant link mechanism maintains a predetermined angular relationship between said stationary and orbiting scroll members and allow said orbiting scroll member to be able to swing radially to effect tangential sealing between said spiral wraps making moving line contact as said orbiting scroll member is driven.

2. A positive fluid displacement apparatus in accordance with claim 1, wherein at least one plenum is formed at the back surface of said first end plate of said orbiting scroll member, and wherein upon introduction of a pressurized fluid said orbiting scroll member is urged towards said stationary scroll member.

3. A positive fluid displacement apparatus in accordance with claim 1, wherein said housing comprises a main housing supporting said stationary scroll member and a base housing supporting said shaft and having three peripheral portions spaced corresponding to said peripheral portions at said orbiting scroll end plate.

4. A positive fluid displacement apparatus in accordance with claim 1, wherein:
   a) said shaft has a crank pin extended from an end of said shaft; said crank pin has a axial hole to balance centrifugal force of said crank pin when said shaft rotates;

b) a bearing hub attached to a central portion of said first end plate of said orbiting scroll member; and c) said sliding knuckle is rotatably supported by two bearings in an axial direction within said bearing hub of said orbiting scroll member, and driven by and rotating together with said crank pin, said sliding knuckle able to slide radially together with said bearing hub and bearings relative to said crank pin, to effect tangential sealing between said spiral wraps making moving line contact as said orbiting scroll member is driven.

5. A positive fluid displacement apparatus in accordance with claim 1, wherein:

wherein each swing link mechanism includes a crank knuckle, said crank knuckles are rotatable within the three said peripheral portions of said first end plate of said orbiting scroll member, respectively, and are driven by and rotate together with said crank handle pins; said crank knuckles are able to swing radially together with said peripheral portions of said orbiting scroll member wound said crank handle pins, respectively, to effect tangential sealing between said spiral wraps making moving line contact as said orbiting scroll member is driven and to maintain a predetermined angular relationship between said scroll members.

6. A positive fluid displacement apparatus in accordance with claim 5, wherein said sliding knuckle and said crank knuckles can slide axially together with said orbiting scroll member with respect to said shaft and crank handle pins, respectively.

7. A positive fluid displacement apparatus in accordance with claim 1, further comprising a synchronizer that synchronizes said crank handles such that in a plane perpendicular to said rotatable shaft, lines drawn through the centers of said crank handles and perpendicular to the direction of said orbiting motion of said orbiting scroll member remain parallel during operation.

8. A positive fluid displacement apparatus in accordance with claim 2, further comprising a seal attached to said first end plate of said orbiting scroll member that seals off said plenum chamber from zones with different pressure.

9. A positive fluid displacement apparatus in accordance with claim 8, wherein said seal comprises a lip seal.

10. A positive fluid displacement apparatus in accordance with claim 8, wherein the seal comprises an axial moving piston and a sealing element that seals off said plenum chamber from zones with different pressure.

11. A positive fluid displacement apparatus in accordance with claim 2, wherein a sealing surface of said orbiting scroll slides against a sealing surface of said housing to seal off said plenum from zones with different pressure.

12. A positive fluid displacement apparatus in accordance with claim 2, wherein a sealing surface of said orbiting scroll slides against a sealing surface of a seal that is moveably attached to said housing to seal off said plenum from zones with different pressure.

13. A positive fluid displacement apparatus in accordance with claim 12, wherein said seal comprises a moveable piston and a sealing element that seal off said plenum from zones with different pressure, wherein the sealing surface of said moveable piston slides against said sealing surface of said orbiting scroll.

14. An orbiting dual thrust ball bearing mechanism, comprising two thrust ball bearings including:

a) a fixed thrust ball bearing having a first stationary washer and a first rotating washer rotatable around its own axis, and first balls located between said first stationary and rotating washers;

b) an orbiting thrust ball bearing having a second stationary washer and a second rotating washer rotatable around its own axis, and second balls located between said second washers;

c) said second stationary washer orbital relative to said first stationary washer, d) said first and second rotating washers slidable relative to each other; and e) said fixed and orbiting thrust ball bearings transfer bearing thrust loads from said second stationary washer to said second balls, then to said second rotating washer, then to said first rotating washer, and then to said first balls and finally to said first stationary washer, or vice versa.

15. An orbiting dual thrust ball bearing mechanism in accordance with claim 14, further comprising a fixed grease retainer that retains grease in said fixed thrust ball bearing and an orbiting grease retainer that retains grease in said orbiting thrust ball bearing.

16. An orbiting dual thrust ball bearing mechanism in accordance with claim 15, wherein said fixed retainer is a bushing fixed within an inner diameter of said first stationary washer and loosely fits with an inner diameter of said first rotating washer to retain grease in said fixed thrust ball bearing, and said orbiting retainer is a bushing fixed within an inner diameter of said second stationary washer and loosely fits within an inner diameter of said second rotating washer to retain grease in said orbiting thrust ball bearing.

17. An orbiting dual thrust ball bearing mechanism in accordance with claim 14, further comprising a shim located between said first and second rotating washers to reduce the friction as said first rotating washer slides relative to said second rotating washer and to adjust the total axial dimension of said orbiting dual thrust ball bearing mechanism.

18. A positive fluid displacement apparatus, comprising:

a) at least one orbiting scroll member with a first end plate having a first spiral wrap affixed to a base surface of said first end plate and three generally equally-spaced peripheral portions at said first end plate;

b) at least one stationary scroll member with a second end plate having a second spiral wrap affixed to a base surface of said second end plate of said stationary scroll member, said second spiral wrap engaged with said first spiral wrap of said orbiting scroll member, wherein when said orbiting scroll member orbits with respect to said stationary scroll member the flanks of said engaging wraps along with said base surface of said first end plate of said orbiting scroll member and said base surface of said second end plate of said stationary scroll member define moving pockets of variable volume and zones of high and low fluid pressures;

c) a rotatable shaft arranged to drive said orbiting scroll member to experience orbiting motion with respect to said stationary scroll member;

d) a housing, said housing supporting said stationary scroll member, and supporting said shaft within a central portion of said housing; said housing having three peripheral portions spaced corresponding to said peripheral portions at said orbiting scroll end plate;

e) at least one orbiting dual thrust ball bearing mechanism that includes a fixed thrust ball bearing and an orbiting thrust ball bearing;

f) said fixed thrust ball bearing having a first stationary washer fixed to a stationary part of said apparatus, a first rotating washer rotatable around its own axis, and first balls located between said first stationary and orbiting washers;

g) said orbiting thrust ball bearing having a second stationary washer fixed to said orbiting scroll member, a second rotating washer rotatable around its own axis, and second balls located between said second stationary and orbiting washers;
h) said first and second rotating washers slidable relative to each other; and
i) said fixed and orbiting thrust ball bearings transfer bearing thrust loads from said second stationary washer to said second balls, then to said second rotating washer, then to said first rotating washer, and then to said first balls and finally to said first stationary washer, or vice versa.

19. A positive fluid displacement apparatus in accordance with claim 18, further comprising:
   three crank handles each having a crank handle axis, each rotatably supported by a corresponding one of said peripheral portions of said housing; and
   a radial compliant link mechanism including a sliding knuckle connecting said shad to said orbiting scroll member and swing link mechanisms connecting said crank handles to said peripheral portions of said orbiting scroll member, each swing link mechanism including an orbiting crank knuckle bearing having a crank knuckle bearing axis and a round crank handle pin connected to the respective crank handle and having a crank handle pin axis, the crank handle pin axis is offset from the crank knuckle bearing axis and offset from the crank handle axis, and the crank knuckle bearing axis is offset from the crank handle axis, where the radial compliant link mechanism maintains a predetermined angular relationship between said stationary and orbiting scroll members and allow said orbiting scroll member to be able to swing radially to effect tangential sealing between said spiral wraps making moving line contact as said orbiting scroll member is driven.

20. A positive fluid displacement apparatus in accordance with claim 18, comprising a plurality of sets of said orbiting dual thrust ball bearing mechanism that together take axial thrust loads and balance a tipping moment of said orbiting scroll member.

* * * * *